United States Patent
Lupkes et al.

(10) Patent No.: US 7,448,200 B2
(45) Date of Patent: Nov. 11, 2008

(54) PULSE COMBUSTION DEVICE

(75) Inventors: Kirk R. Lupkes, Renton, WA (US); Gary L. Lidstone, Federal Way, WA (US); Mark W. Parish, Des Moines, WA (US)

(73) Assignee: United Technologies Corporation, Hartford, CT (US)

( * ) Notice: Subject to any disclaimer, the term of this patent is extended or adjusted under 35 U.S.C. 154(b) by 722 days.

(21) Appl. No.: 11/090,754

(22) Filed: Mar. 24, 2005

(65) Prior Publication Data

US 2006/0213201 A1    Sep. 28, 2006

(51) Int. Cl.
F02K 5/02    (2006.01)
F02K 7/02    (2006.01)

(52) U.S. Cl. ........................................ 60/247; 60/39.38
(58) Field of Classification Search ................... 60/247, 60/39.34, 39.38, 39.39, 39.76, 39.4
See application file for complete search history.

(56) References Cited

U.S. PATENT DOCUMENTS

| | | | | |
|---|---|---|---|---|
| 2,942,412 | A * | 6/1960 | Bollay | ........................ 60/247 |
| 3,417,564 | A | 12/1968 | Call | |
| 3,848,408 | A | 11/1974 | Tompkins | |
| 3,877,219 | A * | 4/1975 | Hagen | ....................... 60/39.38 |
| 4,241,576 | A * | 12/1980 | Gertz | ....................... 60/39.34 |
| 5,353,588 | A | 10/1994 | Richard | |
| 5,873,240 | A | 2/1999 | Bussing et al. | |
| 5,901,550 | A | 5/1999 | Bussing et al. | |
| 6,003,301 | A | 12/1999 | Bratkovich et al. | |
| 6,584,765 | B1 * | 7/2003 | Tew et al. | ...................... 60/249 |
| 6,889,505 | B2 | 5/2005 | Butler et al. | |
| 6,901,738 | B2 * | 6/2005 | Sammann et al. | .......... 60/226.1 |
| 6,931,833 | B2 * | 8/2005 | Lupkes | ........................ 60/207 |
| 6,981,365 | B1 * | 1/2006 | Johnson | ....................... 60/247 |
| 7,047,724 | B2 * | 5/2006 | Nordeen et al. | ............. 60/226.1 |
| 7,062,901 | B1 * | 6/2006 | Johnson | ....................... 60/247 |
| 7,100,360 | B2 * | 9/2006 | Sammann et al. | .......... 60/226.1 |
| 7,251,928 | B2 * | 8/2007 | Kojima et al. | ................. 60/247 |
| 2004/0123583 | A1 | 7/2004 | Nordeen et al. | |
| 2004/0154306 | A1 * | 8/2004 | Benians | ....................... 60/776 |
| 2006/0213201 | A1 * | 9/2006 | Lupkes et al. | ................. 60/776 |
| 2006/0216662 | A1 * | 9/2006 | Lupkes et al. | ................... 431/1 |
| 2007/0157625 | A1 * | 7/2007 | Snyder et al. | ................. 60/776 |

FOREIGN PATENT DOCUMENTS

| | | |
|---|---|---|
| CA | 2061169 A1 | 9/1992 |
| JP | 4320718 | 11/1992 |

OTHER PUBLICATIONS

European Search Report for EP Patent Application No. 06251552.3.

* cited by examiner

*Primary Examiner*—William H Rodriguez
(74) *Attorney, Agent, or Firm*—Bachman & LaPointe, P.C.

(57) ABSTRACT

A pulse combustion device has a number of combustors with upstream bodies and downstream nozzles. Coupling conduits provide communication between the combustors. For each given combustor this includes a first communication between a first location upstream of the nozzle thereof and a first location along the nozzle of another. There is second communication between a second location upstream of the nozzle and a second communication between a second location upstream of the nozzle of a second other combustor and a second nozzle location along the nozzle of the given combustor.

20 Claims, 2 Drawing Sheets

PULSE COMBUSTION DEVICE

BACKGROUND OF THE INVENTION

This invention relates to pulse combustion devices, and more particularly to pulse combustion engines.

Diverse pulse combustion technologies exist. Pulse detonation engines (PDE's) represent areas of particular development. In a generalized PDE, fuel and oxidizer (e.g. oxygen-containing gas such as air) are admitted to an elongate combustion chamber at an upstream inlet end. The air may be introduced through an upstream inlet valve and the fuel injected downstream thereof to form a mixture. Alternatively, a fuel/air mixture may be introduced through the valve. Upon introduction of this charge, the valve is closed and an igniter is utilized to detonate the charge (either directly or through a deflagration to detonation transition process). A detonation wave propagates toward the outlet at supersonic speed causing substantial combustion of the fuel/air mixture before the mixture can be substantially driven from the outlet. The result of the combustion is to rapidly elevate pressure within the chamber before substantial gas can escape inertially through the outlet. The effect of this inertial confinement is to produce near constant volume combustion as distinguished, for example, from constant pressure combustion. Exemplary pulse combustion engines are shown in U.S. Pat. Nos. 5,353,588, 5,873,240, 5,901,550, and 6,003,301.

Additionally, pulse combustion devices have been proposed for use as combustors in hybrid turbine engines. For example, the device may replace a conventional turbine engine combustor. Such proposed hybrid engines are shown in U.S. Pat. No. 3,417,564 and U.S. Publication 20040123583 A1.

BRIEF SUMMARY OF THE INVENTION

One aspect of the invention involves a pulse combustion device having a circular array of combustion conduits. Each conduit includes a wall surface extending from an upstream inlet to a downstream outlet. At least one valve is positioned to admit at least a first gas component of a propellant to the combustion conduit inlets. The device includes an outlet end member. The array and outlet end member are rotatable in at least a first direction relative to each other. Means are provided at least partially in the outlet end member for directing combustion products from at least a first of the conduits to at least a second of the conduits to initiate combustion of the propellant in the second conduit as the array rotates relative to the outlet end member.

In one or more implementations, the outlet end member may be essentially fixed and the array may rotate. Alternatively, the array may be essentially fixed and the outlet end member may rotate. The means may include a passageway within the outlet end member. The outlet end member may further include an igniter. The outlet end member may further include means for introducing at least one of the start-up propellant and a supplemental propellant. The device may be used as a turbine engine combustor. The inlet valve may comprise an inlet end member non-rotating relative to the outlet end member.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
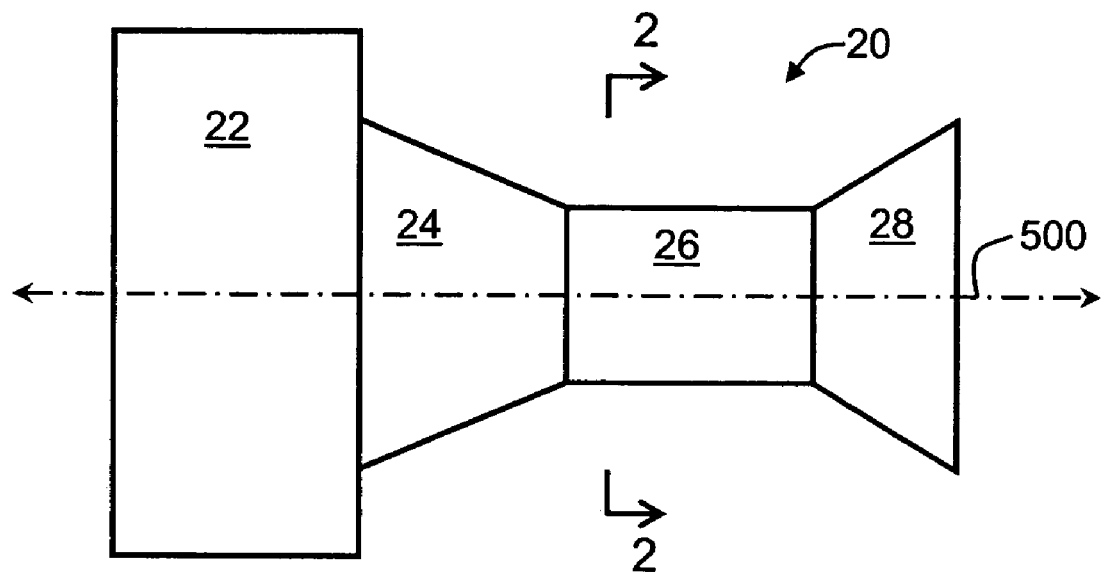
FIG. 1 is a schematic side view of a gas turbine engine.
Figure 2:
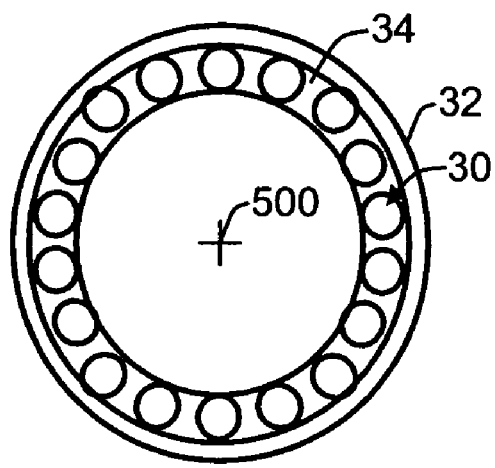
FIG. 2 is a sectional view of a combustor of the engine of FIG. 1, taken along line 2-2.

FIG. 1 shows a gas turbine engine 20 having a central longitudinal axis 500. From upstream to downstream, the exemplary engine 20 includes a fan section 22, at least one compressor section 24, a pulse combustion combustor section 26, and a turbine section 28. The exemplary combustor 26 includes a circumferential array of longitudinally-extending conduits 30 (FIG. 2) mounted within an engine case 32 for rotation about the axis 500 (e.g., supported on a carousel structure 34 which may be on one of the compressor/turbine spools or a separate free spool).

Figure 3:
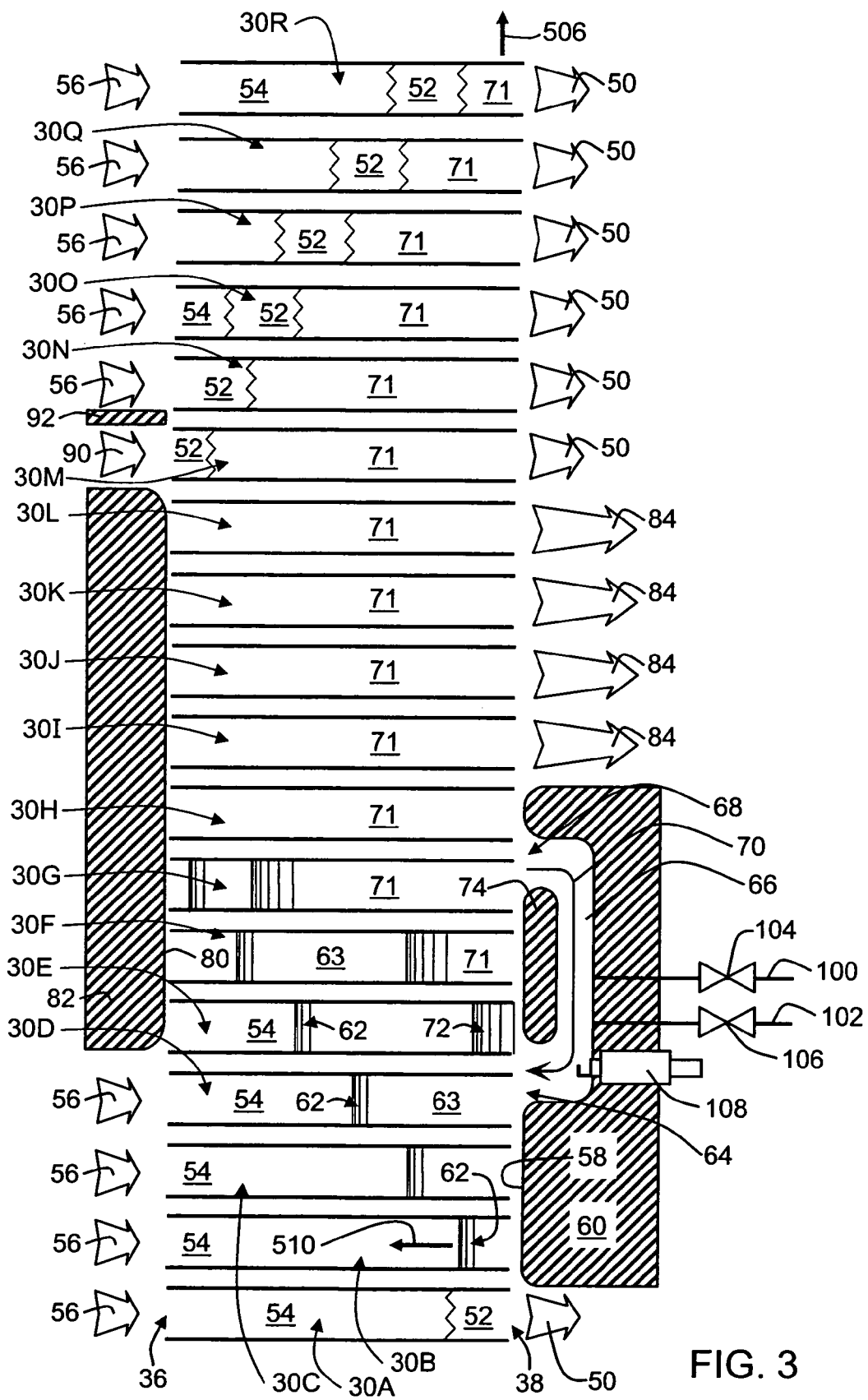
FIG. 3 is a partially schematic unwrapped longitudinal circumferential sectional view of the combustor of the engine of FIG. 1.

FIG. 3 shows further details of the exemplary combustor 26 during steady-state operation. The exemplary combustor array includes eighteen combustor conduits 30 (shown for illustration as straight circular sectioned tubes oriented longitudinally). Alternative cross-sections including annular sectors are possible, as are non-longitudinal orientations and non-straight configurations. The direction of rotation is labeled as 506. Positions of the tubes at an exemplary point in the cycle are respectively designated as 30A-30R. Each exemplary tube 30 has an upstream inlet 36 and a downstream outlet 38. For ease of reference, the tubes will be identified by the reference numerals associated with the illustrated positions. At the illustrated instance in time, a last bit of a purge flow 50 of combustion products is exiting the outlet 38 of the tube 30A. A slug of a buffer gas 52 is in a downstream end portion of the tube 30A following right behind the purge flow 50. A propellant charge 54 follows behind the buffer slug 52, being delivered by a propellant fill flow 56 through the inlet 36. An exemplary propellant flow includes a gaseous oxidizer (e.g., air) and a fuel (e.g., a gaseous or liquid hydrocarbon). In the exemplary turbine engine embodiment, the air may be delivered from the compressor 24 and the fuel may be introduced by fuel injectors (not shown).

At the illustrated point in time, the next tube 30B has just had its outlet closed by passing in front of an upstream face 58 of a relatively non-rotating combustor downstream member 60. At the point of closure/occlusion, some or all of the buffer slug 52 may have exited the tube outlet. The buffer slug 52 serves to prevent premature ignition of the charge 54 due to contact with the combustion gases. The closure of the outlet port causes a compression wave 62 to be sent in a forward/upstream direction 510 through the charge 54 leaving a compressed portion 63 of said charge in its wake.

This compression process continues through the position approximately shown for tube 30C. At some subsequent point (e.g., as shown for the tube 30D) the tube outlet becomes exposed to a port 64 in the member 60. The port 64 is an outlet port for a passageway 66. The passageway 66 has an inlet port 68. The inlet port 68 is positioned to be open/exposed to the outlet of one or more tubes in a later position (e.g., approximately the position shown for tube 30G). As is discussed in further detail below, by the time a tube has reached this later position, combustion is already occurring. Accordingly, a flow 70 of combustion products 71 from such tube may pass through the passageway 66 from the inlet port 68. When these hot combustion products exit the outlet port 64, they come into contact with the compressed portion 63 of the charge 54 behind the compression wave 62. The hot combustion products produce combustion of the compressed charge 63 causing detonation and sending a detonation wave 72 forward/upstream after the compression wave 62 (e.g., as shown for tubes 30E, 30F, and 30G). The newly-formed combustion products 71 are left in the wake of the detonating wave.

In the exemplary engine, the member 60 includes a blocking wall portion 74 between the passageway inlet 68 and outlet 64. This helps prevent combustion gases from leaking from the tube outlets as the tubes pass between the passageway outlet 64 and the passageway inlet 68. This blockage also helps direct the detonation wave 72.

A surface 80 of a main portion of a relatively non-rotating combustor upstream member 82 is positioned to block the tube inlets during a main portion of the combustion process. In the exemplary implementation, the surface 80 (a downstream face) is positioned to block the inlets 36 to prevent upstream expulsion of the charge 54 as the compression wave 62 approaches. The surface 80 is also positioned to prevent upstream discharge of combustion products during a high pressure interval thereafter. An exemplary circumferential extent of the surface 80 is between 40° and 160° (more narrowly, 90° and 120°).

In the exemplary combustor, there is a brief interval shown for the tube 30H wherein both its inlet and outlet are blocked after the outlet has passed out of exposure to the passageway inlet 68. Alternative configurations may lack this interval. Shortly thereafter (e.g., as shown for the tube 30I) the tube outlet clears the surface 58 and is thus opened. A blow down flow 84 of high pressure combustion gases then exits the tube outlet. This blow down interval may continue (e.g., for the tubes shown as 30J, 30K, and 30L).

After the blow down interval, there may be a buffer filling interval wherein an inlet buffer flow 90 generates the buffer slug 52 upstream of the combustion gases 71. The exemplary flow 90 may be of unfueled air. In the exemplary combustor, this flow 90 is isolated from the flow 56 by a narrow segment 92 of the upstream member 82 (thereby defining a port through which the flow 90 passes). Alternative configurations could lack such a segment 92 and rely on injector positioning to keep the flow 90 relatively unfueled. Thereafter, through several further stages (e.g., for tubes 30M, 30N, 30O, 30P, 30Q, 30R, and finally returning to 30A) the tube may be recharged with propellant.

At start-up, engine spool rotation may be commenced by conventional pneumatic or electric drive. The start-up condition may lack the flow 70. Accordingly, additional start-up means may be provided. In one example, FIG. 3 shows fuel and oxidizer lines 100 and 102 extending to the passageway 66 and controlled by valves 104 and 106. These lines 100 and 102 may be used to introduce start-up amounts of fuel and oxidizer to the passageway which, in turn, are ignited by an igniter 108 (e.g., a spark igniter) to provide a start-up flow of combustion products.

The fuel and oxidizer lines 100 and 102 (or other separate lines) may also be used to introduce supplemental amounts of fuel and/or oxidizer during steady-state operations and/or transient conditions. Depending on circumstances, such supplemental quantities may be lean, rich, or stoichiometric.

Operation of the exemplary combustor may tend to be self-timing. However, additional timing control may be provided. For example, means may be provided to change the relative phases of the downstream and upstream members 60 and 82 (e.g., by shifting their orientational phase about the axis 500). Alternatively, means may be provided for varying the attributes of either of these members individually. For example, there may be multiple passageways in the downstream member 60 or a single passageway may have multiple outlets or inlets which may be selectively opened or closed individually or in combinations. Similarly, the circumferential extent of blocking provided by the upstream member 82 might be made adjustable as might be the circumferential extents and positionings of the respective fueled and unfueled flows 56 and 90.

In alternative embodiments, the tube array may be fixed and at least the downstream member may be rotating. An upstream member rotating synchronously with the downstream member will provide a similar operation as discussed above for FIG. 3. However, the valving interaction of the upstream member with the tubes could easily be replaced with discrete valves at the inlet ends of each tube. Such discrete valves would provide greater flexibility in timing control of the combustion process.

One or more embodiments of the present invention have been described. Nevertheless, it will be understood that various modifications may be made without departing from the spirit and scope of the invention. For example, even with the basic construction illustrated, many parameters may be utilized to influence performance. Accordingly, other embodiments are within the scope of the following claims.

What is claimed is:

1. A pulse combustion device comprising:
   a circular array of combustion conduits, each comprising a wall surface extending from an upstream inlet to a downstream outlet;
   at least one inlet valve positioned to admit at least a first gas to the combustion conduit inlets;
   an outlet end member, the array and outlet end member rotatable in at least a first direction relative to each other, wherein:
   the outlet end member includes a passageway positioned to direct combustion gasses from one or more of said conduits in a first range of positions to one or more of said conduits in a second range of positions.

2. The device of claim 1 wherein:
   wherein the outlet end member is essentially fixed and the array rotates about a single central longitudinal axis.

3. The device of claim 2 wherein the inlet valve comprises:
   a segment of an annular wall surface positioned to block the inlet ports of the conduits during a single portion of a revolution, said single portion being between 40° and 160°.

4. The device of claim 1 wherein the outlet member further includes:
   an igniter having an operative end in the passageway.

5. The device of claim 1 wherein the outlet member further includes:
   at least one port for introducing at least one of a start-up propellant and a supplemental propellant.

6. The device of claim 1 wherein the circular array of combustion conduits comprises between ten and fifty conduits, inclusive.

7. The device of claim 1 wherein the circular array of combustion conduits comprises between twelve and twenty-five conduits, inclusive.

8. A pulse combustion device comprising:
   a circular array of combustion conduits, each comprising a wall surface extending from an upstream inlet to a downstream outlet;

at least one inlet valve positioned to admit at least a first gas component of a propellant to the combustion conduit inlets;

an outlet end member, the array and outlet end member rotatable in at least a first direction relative to each other; and means at least partially in the outlet end member for directing combustion products from at least a first of the conduits to at least a second of the conduits to initiate combustion of said propellant in the second conduit as said array rotates relative to the outlet end member.

9. The device of claim 8 wherein the outlet end member is essentially fixed and the array rotates.

10. The device of claim 8 wherein the array is essentially fixed and the outlet end member rotates.

11. The device of claim 8 wherein the means comprises a passageway within the outlet end member.

12. The device of claim 8 wherein the outlet member further includes: an igniter.

13. The device of claim 8 wherein the outlet member further includes:

means for introducing at least one of a start-up propellant and a supplemental propellant.

14. The device of claim 8 used as a turbine engine combustor.

15. A method for operating a pulse combustion device, the device comprising:

a plurality of combustor conduits, each comprising:
a wall surface;
an upstream inlet; and
a downstream outlet, the method comprising sequentially and cyclically for each conduit:

introducing a propellant into said conduit; and discharging into said conduit combustion gasses from another of the conduits so as to initiate combustion of said propellant in said conduit.

16. The method of claim 15 wherein:

the discharging gas comprises directing said combustion gasses from the outlet of said another conduit into said conduit through the outlet of said conduit; and the introducing is through the inlet of said conduit.

17. The method of claim 16 wherein:

the directing said combustion gasses comprises blocking the inlet of said another conduit.

18. The method of claim 16 wherein:

the directing said combustion gasses comprises unblocking the outlet of said conduit.

19. The method of claim 15 further comprising:

rotating the plurality of combustor conduits about a longitudinal axis relative to an outlet end member; and during the rotating, the outlet end member blocks the outlets of the combustor conduits as said outlets pass through a portion of a cycle.

20. The method of claim 19 wherein:

the discharging comprises passing through passageways in the outlet end member.

* * * * *